United States Patent [19]

Schomburg et al.

[11] 4,373,003
[45] Feb. 8, 1983

[54] HIGH TEMPERATURE SILICON CARBIDE IMPREGNATED INSULATING FABRICS

[75] Inventors: Calvin Schomburg, Houston; Robert L. Dotts, Seabrook, both of Tex.

[73] Assignee: The United States of America as represented by the Administrator of the National Aeronautics and Space Administration, Washington, D.C.

[21] Appl. No.: 365,950

[22] Filed: Apr. 6, 1982

[51] Int. Cl.$^3$ .............................................. B32B 5/16
[52] U.S. Cl. .................................. 428/241; 428/244; 428/245; 428/260; 428/331; 428/368; 428/902; 428/913; 428/920
[58] Field of Search ............... 428/244, 245, 323, 331, 428/368, 913, 920, 902, 260, 241

[56] References Cited

U.S. PATENT DOCUMENTS

| | | | |
|---|---|---|---|
| 3,123,488 | 3/1964 | Lindlaw | 106/268 |
| 3,184,323 | 5/1965 | Lindlaw | 106/268 |
| 3,236,673 | 2/1966 | O'Connor et al. | 423/345 |
| 3,623,904 | 11/1971 | Ramseyer | 523/179 |
| 4,308,309 | 12/1981 | Frosch et al. | 428/245 |
| 4,342,803 | 8/1982 | Stengle | 428/244 |

*Primary Examiner*—James J. Bell
*Attorney, Agent, or Firm*—Marvin F. Matthews; John R. Manning; Russell E. Schlorff

[57] ABSTRACT

High temperature insulating articles are provided having improved performance characteristics. The articles comprise fabrics of closely woven refractory or heat resistant fibers having particles of silicon carbide dispersed at least partially through the fabric and bonded to the fibers with an emulsifiable polyethylene wax. Such articles exhibit significantly increased high temperature emittance characteristics and an improved retention of integrity and flexibility after prolonged exposure to high temperature.

10 Claims, No Drawings

HIGH TEMPERATURE SILICON CARBIDE IMPREGNATED INSULATING FABRICS

DESCRIPTION

Origin of the Invention

The invention described herein was made by employees of the U.S. Government and may be manufactured and used by or for the Government of the United States of America for governmental purposes without the payment of any royalties thereon or therefor.

TECHNICAL FIELD

This invention relates to high temperature, flexible, insulating fabrics of closely woven heat resistant fibers. More particularly, this invention relates to such fabrics having particles of silicon carbide dispersed through the fabric and bonded to the fibers. The fabrics of this invention exhibit a significantly increased high temperature emittance and a retention of their desired flexibility and insulation characteristics on exposure to exceptionally high temperature conditions over extended periods of time.

The exterior surfaces of aerospace vehicles are subjected to high temperatures at various times during a space mission. Extremely high temperatures are encountered when the vehicle reenters the earth's atmosphere at high speed on its return flight. To protect against the disastrous effects of such high temperatures, a portion or all of the exposed metallic surfaces of an aerospace vehicle are covered with an insulating material. In the case of the Space Shuttle, in order to prevent the skin temperature from exceeding 175° C., approximately 30,000 tiles were affixed to exterior metallic surfaces of the vehicle. Each tile was approximately 15 centimeters square and varied in thickness from about 2.5 centimeters to about 10 centimeters. Each tile consisted of a mass of non-woven, finely drawn and exceptionally pure silica fibers bonded together by partial fusion to form a rigid porous structure. The exterior or exposed surface of each tile in a critical location, such as the underside of the Space Shuttle, was coated with a dark silica coating in order to impart high temperature emittance characteristics to the surface of the tile. The acceptable performance of a tile depends on both the composition of the tile and the high temperature emittance characteristics of the exposed surface.

The metallic skin of the space shuttle undergoes lateral dimensional changes as it encounters or develops widely varying temperatures during the space flight. To allow for such dimensional changes, the tiles described above are spaced slightly apart from each other when affixed to the exterior metallic surface of the vehicle. Some of these resulting spaces or gaps between the tiles, if left unfilled, would result in exposing the small area of the metallic skin at the bottom of the gap directly to the high temperatures encountered during reentry. Even though the area of the metallic skin of the vehicle exposed by virtue of such gaps is relatively small, the exposed area must be protected by appropriate insulation. Furthermore such insulation must have a sufficient flexibility and cushioning to keep the gap filled and still permit some lateral movement between the tiles.

It is an object of this invention to provide an improved insulating material having utility as a gap filler in the above mentioned application as well as in other more conventional industrial applications. Other objects will become apparent from the description of the invention.

BACKGROUND ART

Compounds of silicon, including silicon carbide, have been disclosed in the art as having some utility as fillers or pigments in coating compositions (see U.S. Pat. No. 3,271,109 and U.S. Pat. No. 3,236,673). In all such cases, the ultimate sought for compositions were multicomponent mixtures containing various fillers, pigments, extenders, film formers, driers, etc. to be used as surface coatings for such conventional purposes as decorative effect of surface protection in normal use. Silicon carbide has also been disclosed as an ingredient in ablative compositions (see U.S. Pat. No. 3,623,904). The use of various materials as suspension agents in conventional coating compositions is also disclosed in the art. Such suspension agents include hydrogenated castor oil, aluminum distearate and emulsifiable polyethylene waxes (see U.S. Pat. No. 3,123,488 and U.S. Pat. No. 3,184,323).

DISCLOSURE OF INVENTION

According to this invention, a novel high temperature insulating article is provided which comprises a flexible, high temperature, insulating fabric of closely woven heat resistant fibers having finely divided particles of silicon carbide dispersed through the fabric and bonded to the fibers with an emulsifiable polyethylene wax. Particularly preferred articles of this invention are those wherein the fabric is closely woven heat resistant fibers of silica or alumina borosilicate.

Investigations revealed that, while fabrics of the preferred fibers are per se a good insulating composition, they were not acceptable in the aerospace application described above. Under the conditions encountered on reentry, excessively high temperatures would be encountered in the fabric and the metallic skin being protected, and the fabrics would become embrittled requiring a costly replacement following each flight. Such fabrics having finely divided particles of silicon carbide dispersed through the fabric and bonded to the fibers with an emulsifiable polyethylene wax were found to have such an increased high temperature emittance char-acteristic that, under the extreme conditions of reentry, a much lower maximum temperature within the fabric was maintained and the metallic skin temperature never exceeded a safe maximum level.

The novel fabrics of this invention can be conveniently prepared by at least partially impregnating the woven fabric with a mixture of silicon carbide particles and an emulsifiable polyethylene wax dispersed in a suitable liquid organic vehicle or carrier. After impregnation of the fabric with such a mixture, the carrier evaporates leaving the silicon carbide particles dispersed at least partially throughout the fabric, including the surface thereof, bonded to the fibers with the emulsifiable polyethylene wax.

DESCRIPTION OF THE PREFERRED EMBODIMENT

An impregnating composition was prepared by vigorously stirring with an electric laboratory stirrer a mixture of butyl alcohol, 1,000 mesh powdered silicon carbide and an emulsifiable polyethylene wax having a molecular weight of about 2,000 and an acid number of 7-14. The impregnating composition so prepared had the following composition with all percentages being expressed as percent by weight of total composition:

| Ingredient | Percent |
| --- | --- |
| Butyl Alcohol | 82% |
| Silicon carbide | 12% |
| Emulsifiable polyethylene wax | 6% |

Samples of two types of fabrics were employed in this test example. The first fabric consisted of closely woven silica fibers, the individual fibers having a diameter of 1-3 microns. The second fabric consisted of closely woven alumina borosilicate fibers, the individual fibers having a diameter of 10-12 microns. Fabric thickness among the various samples varied from 0.2 mm up to about 0.8 mm.

The above mentioned fabrics were then used to prepare tile gap fillers sized to the thickness and depth of the gap to be filled. The gap filler consisted of a 0.2 mm thick Inconel foil, enveloped by the insulating fabric. The Inconel foil is for the purpose of providing dimensional stability to the filler, avoiding any sag in the filler once installed. In the case of the larger gaps, up to approximately 1 centimeter or more in thickness, two Inconel foils were used and a quantity of high purity silica fiber insulation was also inserted into the envelope between the two foils and between the foils and the enveloping fabric. In addition to providing a gap filler of the required thickness, these additional silica fibers provided the desired flexible cushioning effect between the adjacent tiles.

Gap fillers so prepared were then impregnated with the mixture above described. Impregnation can be carried out by spraying or brushing the mixture onto the gap filler or by dipping the gap filler into the mixture. The mixture is applied in a quantity sufficient to provide thorough penetration of the mixture throughout the thickness of the fabric.

After complete evaporation of the butyl alcohol, the thus treated gap fillers having silicon carbide particles and polyethylene wax dispersed on the surface and throughout the fabric bonded to the fibers, along with untreated gap fillers as controls, were subjected to the action of a Plasma Arc Jet which generated a surface temperature on the gap filler of approximately 2,300° F. (1,260° C.). In this test, untreated gap fillers had a high temperature emittance of approximately 0.35 whereas the treated gap fillers had a high temperature emittance of approximately 0.75. The operating temperature of the treated gap filler was approximately 1,900° F. (1,030° C.) while the operating temperature of the untreated gap filler was approximately 2,300° F. (1,260° C.). During the test the untreated gap filler became embrittled and would not have been reusable had such an exposure been encountered on reentry. On the other hand, the treated gap fillers retained their integrity and flexibility and would not have had to be replaced for a second space flight.

The silicon carbide used in this invention should be in finely divided state to facilitate a complete and uniform dispersion of the particles throughout the fabric. This is best accomplished using particles of silicon carbide fine enough to pass through a 1,000 mesh screen.

The polyethylene waxes employed in this invention are emulsifiable polyethylene waxes having free carboxyl groups, a molecular weight of from about 1,500 to 6,000 and an acid number from about 2 to about 50. Preferably such waxes have a molecular weight of from about 2,000 to about 2,500 and an acid number from about 7 to about 50. Particularly preferred is a wax having a molecular weight of about 2,000 and an acid number of about 7 to about 14. To facilitate handling, the polyethylene wax can be employed in the form of a premix with an alkyl alcohol, such as butyl alcohol, the alcohol being a softening agent for the wax, promoting rapid dispersion. In this particular application these waxes uniquely function as binding agents and sizing agents for the fabrics, binding the silicon particles to the fibers and enhancing the retention of flexibility in the fabric throughout exposure to high temperatures.

While specific reference has been made to fabrics of closely woven silica or alumina borosilicate fibers, this invention is not thereby so limited. This invention contemplates the use of fabrics of other refractory fibers, their use being dependent upon the particular insulating conditions encountered.

The degree of impregnation of the fabric can be varied substantially, depending upon the results desired. For example, in the case of gap fillers described herein, while the totality of the fabric envelope of the gap filler can be impregnated in accordance with this invention, satisfactory performance of such gap fillers was realized with partial impregnation, viz., when the gap filler was impregnated from the surface exposed to a depth of about ⅓ of the total vertical depth of the gap filler. Generally impregnation and surface coating of the fabric should be such as to produce an increase in the dry weight (silicon carbide and polyethylene wax combined) of the fabric in the amount of from about 0.02 to about 0.1 gram per square inch (about 0.003 to about 0.02 gram per square centimeter) of fabric. Increasingly extreme temperature conditions will of necessity require a higher degree of impregnation.

The ratio of the quantity of silicon carbide particles to the quantity of the particular polyethylene wax with which the fabric is impregnated is subject to substantial variation. The quantity of silicon carbide particles dispersed through the fabric is governed by the incremental increase in high temperature emittance desired. The quantity of polyethylene wax dispersed throughout the fabric is that quantity necessary to adhere the silicon carbide particles to the individual fibers while enhancing the retention of integrity and flexibility in the fabric throughout the exposure to high temperatures. Being amorphous in character, only minor amounts of the polyethylene wax need be employed. A weight ratio of silicon carbide particles to polyethylene wax ranging from about 1:1 to 10:1 are applicable.

Impregnation of fabrics with silicon carbide particles and polyethylene waxes to produce the novel articles of this invention can be accomplished in any convenient manner. The technique described herein is particularly simple and effective. The content of such impregnating liquid mixtures can be substantially varied. Such mixtures containing from about 5 to about 25% by weight of silicon carbide and from about 1 to about 10% by weight of the emulsifiable polyethylene wax are particularly useful. Many liquid organic materials can serve as the vehicle or carrier. The liquid vehicle or carrier should be such as to facilitate the preparation of a uniform and rather stable dispersion of the silicon carbide and polyethylene wax, facilitate penetration throughout the fabric or to the extent desired and have a volatility such that it promotes rapid drying of the treated fabric. The lower alkyl alcohols are particularly useful in this regard. Such alcohols would include methyl, ethyl, propyl, butyl, etc. alcohols.

While the invention disclosed herein has been described in connection with its aerospace applications, the invention is not limited thereto. Furthermore, the particularly described total construction of the gap filler is not intended to be construed as a limitation on this invention. The fabric forming the envelope of the gap filler can be impregnated prior to fabrication of the gap filler with equally advantageous results. Fabrics of closely woven refractory fibers have wide industrial applications as insulating materials. Such fabrics for industrial applications having silicon carbide particles dispersed through the fabric and bonded to the individual fibers with an emulsifiable polyethylene wax in accordance with this invention will exhibit much improved performance characteristics.

What is claimed is:

1. A high temperature insulating article comprising a fabric of closely woven heat resistant fibers having particles of silicon carbide dispersed at least partially throughout the fabric and bonded to the fibers with an emulsifiable polyethylene wax having free carboxyl groups and having a molecular weight of from about 1,500 to about 6,000 and an acid number of from about 2 to about 50.

2. The article of claim 1 wherein the particles of silicon carbide are dispersed throughout the fabric.

3. The article of claim 1 wherein the emulsifiable polyethylene wax has a molecular weight of from about 2,000 to about 2,500 and an acid number of from about 7 to about 50.

4. The article of claims 1 or 3 wherein the fibers are silica fibers.

5. The article of claims 1 or 3 wherein the fibers are alumina borosilicate fibers.

6. The article of claim 1 wherein the fabric contains from about 0.003 to about 0.02 gram of the combination of silicon carbide particles and polyethylene wax per square centimeter of fabric surface.

7. The article of claim 6 wherein the emulsifiable wax has a molecular weight of from about 2,000 to about 2,500 and an acid number of from about 7 to about 50.

8. The article of claim 7 wherein the silicon carbide particles are of a size to pass a 1,000 mesh screen.

9. The article of claim 8 wherein the fibers are silica fibers.

10. The article of claim 8 wherein the fibers are alumina borosilicate fibers.

* * * * *